Jan. 26, 1937. P. E. HAWKINSON 2,069,090
TIRE RETREAD AND PROCESS OF PRODUCING AND APPLYING THE SAME
Filed Feb. 11, 1935   2 Sheets-Sheet 1
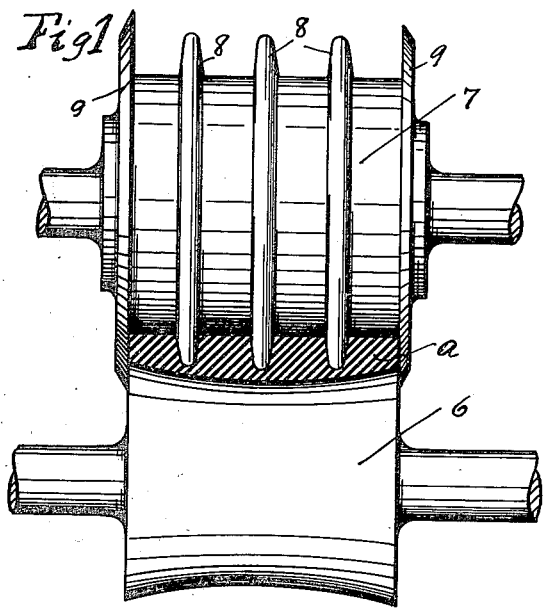
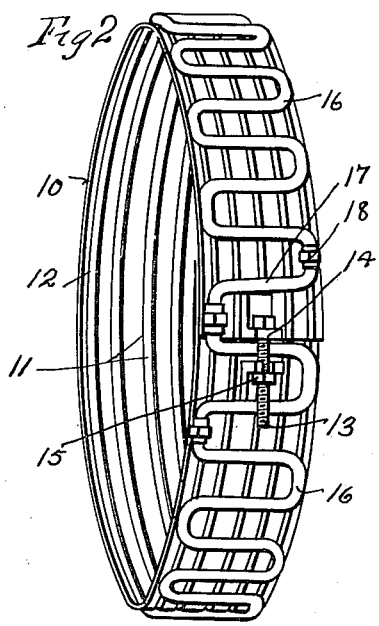
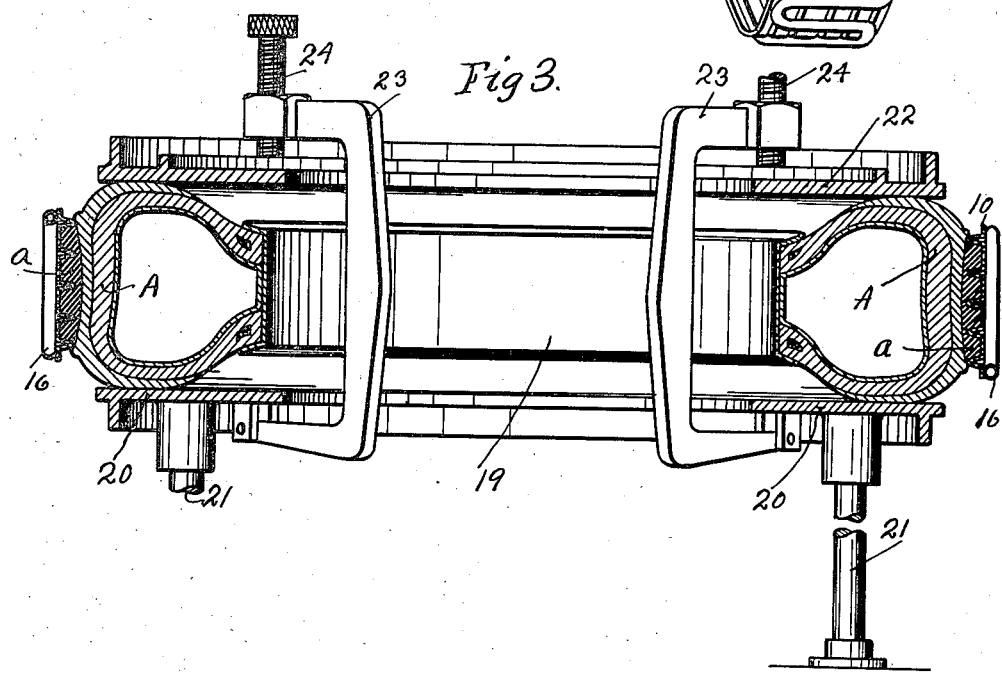
INVENTOR
PAUL E. HAWKINSON
BY HIS ATTORNEYS Jan. 26, 1937. P. E. HAWKINSON 2,069,090
TIRE RETREAD AND PROCESS OF PRODUCING AND APPLYING THE SAME
Filed Feb. 11, 1935 2 Sheets-Sheet 2
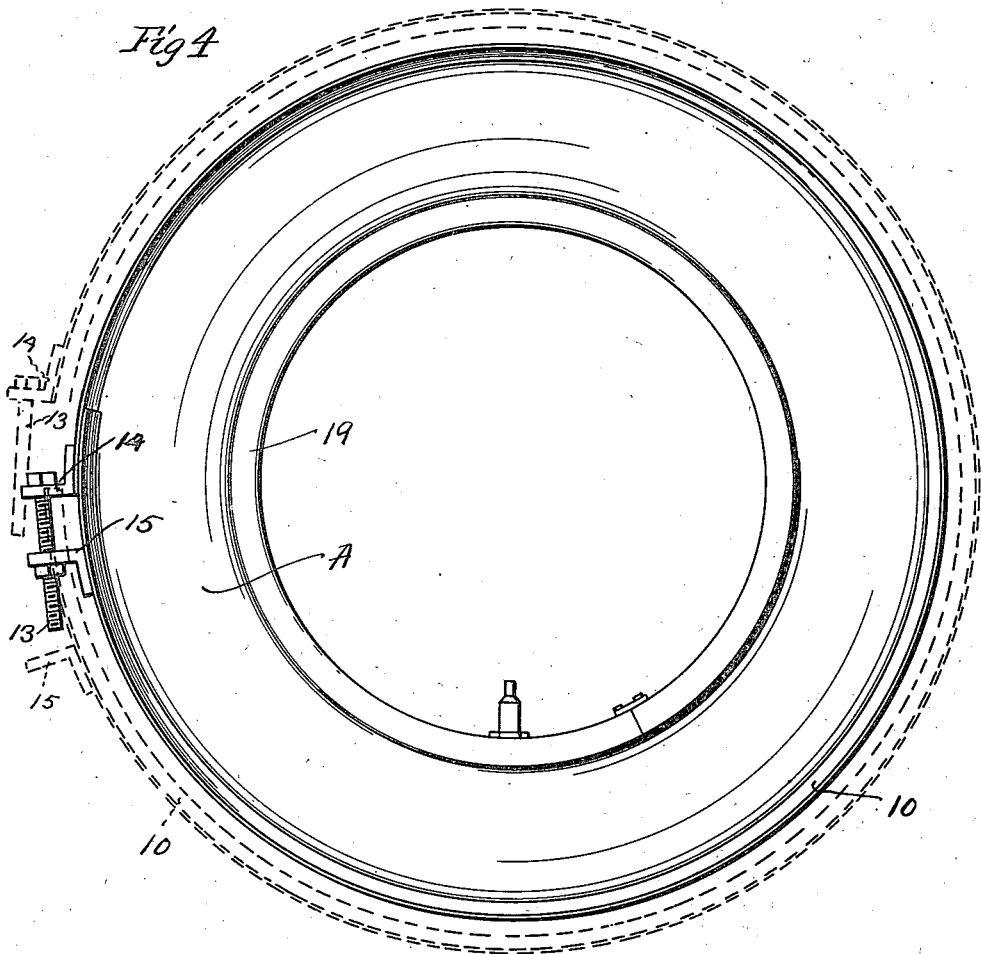
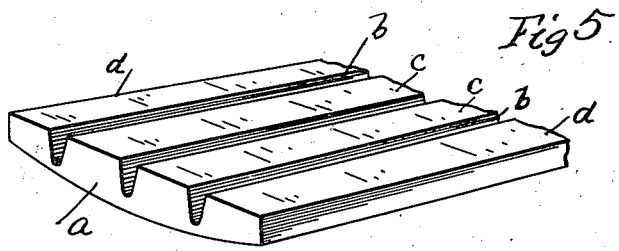
INVENTOR
PAUL E. HAWKINSON
BY HIS ATTORNEYS Patented Jan. 26, 1937

2,069,090

UNITED STATES PATENT OFFICE 2,069,090

TIRE RETREAD AND PROCESS OF PRODUCING AND APPLYING THE SAME

Paul E. Hawkinson, Minneapolis, Minn.

Application February 11, 1935, Serial No. 6,011

4 Claims. (Cl. 18—59)

My present invention relates to the retreading of pneumatic tire casings and involves also an improved process of producing and applying said rubber tread.

Particularly, the invention relates to the use, in retreading tire casings, of an expansible and contractible mold having an internal pattern therein, and the production of a rubber tread band pre-formed with a pattern corresponding to that of the mold. Molds of the above character usually have internal flanges and grooves that form in the rubber tread, circumferentially extended grooves and ribs. Hitherto it has been customary to provide the tread rubber in the form of smooth-faced bands of unvulcanized rubber and in the use of such molds, the grooves and ribs have been formed in the tread rubber bands after the latter have been applied to the tire casing and in the operation of contracting the mold onto the applied rubber. In doing this, a serious difficulty has been encountered in that the contraction of the mold has necessarily been not only sufficient to tighten the mold onto the tire casing, but sufficient to force the ribs of the mold into the applied rubber tread. When this action takes place, at the same time that the mold is being contracted, there is such very great frictional engagement between the mold and the rubber tread, that the rubber will be caused to drift in the direction in which the mold is contracted. Otherwise stated, there will be little or no slippage of the mold on the rubber tread and rubber will be caused to flow between or at the joint or joints of the mold, thereby very greatly interfering with the proper contraction of the mold. The above statement is true whether the mold is made in one piece split at one point or is made of a plurality of sections.

In accordance with my present invention, I make or pre-form the rubber tread band or ribbon with grooves and ribs that match and will fit the ribs and grooves of the mold. By this arrangement, the ribs of the mold do not cut but fit the grooves of the rubber tread band or ribbon so that in tightening and contracting the mold, there will be comparatively little frictional engagement between the mold and the tread rubber, and moreover, this friction can be further reduced by using a substance such, for example, as powdered soap-stone either on the mold or on the outer surface of the applied tread rubber. In fact, the drifting or drawing circumferentially of the applied tread rubber in the contraction of the mold can be nearly eliminated.

In the accompanying drawings, I have illustrated one means for forming the rubber tread band or ribbon and means for carrying out the process herein claimed, which is as hereinafter described.

Referring to the drawings:

Fig. 1 is an elevation with some parts broken away, illustrating the type of forming rollers that may be used in the production of rubber retread bands or ribbons with preformed designs or pattern;

Fig. 2 is a perspective showing one type of expansible and contractible mold that may be employed;

Fig. 3 is a view chiefly in vertical section illustrating certain apparatus that may be advantageously used in carrying out the process;

Fig. 4 is a plan view showing a tire with applied mold; and

Fig. 5 is a perspective showing a portion of the pre-formed retread band or ribbon.

Referring first to Fig. 1, the numeral 6 indicates one of the forming rollers, the same preferably being made with a concave face so as to give convex form to the inner surface of the retread rubber $a$; and the numeral 7 indicates the upper or co-operating forming roll which is formed with circumferential ribs 8 and with shearing edges 9. When the unvulcanized rubber stock is fed between these rollers, it will be sheared or formed to the right width by the flanges 9 and the ribs 8 will form parallel longitudinal grooves $b$ with intervening ribs $c$ and outside ribs $d$.

The mold 10 illustrated, is made of quite thin sheet steel bent to form internal circumferentially extended parallel ribs 11 that are of the same design and spacing as the grooves $b$ formed in the tread rubber band $a$ by the roller ribs 8. Also, this mold is formed with outside ribs 12 that are parallel to the intermediate ribs 11, but preferably have somewhat greater depth. These ribs 12 are spaced so that they will embrace or engage the outer edges of the tread rubber $a$.

In the form of the mold illustrated, the ends of the mold are overlapped with the grooves of the external ends engaging the outwardly bulged ribs of the inner ends. When the mold is made of thin sheet steel or other proper metal, the slight offset formed by the lapping of the ends of the mold will not be very perceptible and may be easily removed by slight buffing, if found objectionable. Contracting and tightening of the mold may be accomplished in any suitable way as by a nut-equipped bolt 13 passed through lugs 14 and 15 on the exterior of the end portions of the mold. For applying steam to heat the mold and vulcanize the rubber, a tortuous steam pipe 16 is shown as placed around the mold and provided with detachable sections 17 securable to the main sections and together by suitable couplings 18. More or less of these sections 17 or sections of different size, may be used where there is very considerable variation in the diameter of the adjusted mold but there is sufficient flexibility in the pipe to permit of considerable adjustments without interchange of sections. This pipe 16 will be connected in any suitable way, not shown, to a source of steam supply; and so far as this invention is concerned, any suitable means may be used for heating the mold.

In Figs. 3 and 4, the numeral 19 indicates a wheel rim such as used on automobile wheels applied to the tire casing A. Also in Fig. 3, the numeral 20 indicates a lower annular clamping plate supported by legs 21, and the numeral 22 indicates an upper annular clamping plate which is connected to the lower plate by means of yokes 23 and screws 24. After the tread rubber band or ribbons have been formed as above described, they will be applied to the tire casing much as is practiced in applying the smooth-faced rubber ribbons thereto. This operation, as is well known, includes first grinding and roughening the tread face of the tire casing so that the rubber will better adhere thereto when vulcanized. After the tread rubber has been applied to the casing and temporarily secured by cement, the mold will be applied around the applied tread rubber with its ribs 11 engaging the grooves of the tread rubber, and the ribs 12 embracing the edges of the rubber. Then the mold will be tightened onto the tire casing.

Before the tread rubber has been applied to the tire, the rim 19 should be applied thereto and advisably the tire should be inflated to some extent. Then the tire may be placed between the clamping plates 20 and 22 and the clamps 22—24 adjusted to prevent spreading or separation of the clamping plates. After the mold has been contracted to the desired extent, then further pressure may be introduced into the tire, thereby increasing the pressure of the contacting portions of the casing and tread rubber.

Under the foregoing operation, it is thought to be evident that the contraction of the mold will not cause any material circumferential creeping or drifting of the applied tread rubber. After the above operation has been performed, steam should be turned onto the pipe 16—17 and sufficient heat produced to vulcanize the tread rubber onto the tire.

The above is the preferred manner of carrying out the process herein claimed. If a tread pattern including not only circumferential but transverse grooves and ribs is to be produced, the roller 7 must, of course, be provided with axially or longitudinally extended ribs, as well as the circumferentially extended ribs 8; and when such a pattern is produced, the tread rubber may be first applied in the mold with its grooves fitting the ribs of the latter, and then the tread rubber will be applied to the tire casing.

What I claim is:

1. The method of retreading tires by the use of a mold having internal pattern forming ribs and grooves therein, which consists in forming a rubber retreading band with pattern pre-forming ribs and grooves corresponding to those of said mold; thereafter applying the band thus preformed around the tire casing and with its pattern fitting the pattern of said mold; and thereafter applying heat to vulcanize the tread rubber onto said casing while confined within said mold.

2. The method of retreading tire casings by the use of a contractible mold having design-forming internal ribs and grooves, which involves preforming a rubber retreading band with grooves and ribs corresponding to those of said mold; thereafter applying the grooved and ribbed retread band around a tire and within said mold with the ribs of the latter fitting the grooves of the former; thereafter contracting said mold to press the retread rubber against said casing; and thereafter applying heat to vulcanize the tread rubber onto said casing while confined within said mold.

3. The method described in claim 1 in which the pattern of the mold and the pattern preformed on the retread band are parallel matching circumferentially extended grooves and ribs.

4. The method described in claim 2 in which the pattern of the mold and the pattern preformed on the retread band are parallel matching circumferentially extended grooves and ribs.

PAUL E. HAWKINSON.